(12) United States Patent
Robertson et al.

(10) Patent No.: US 7,159,737 B2
(45) Date of Patent: Jan. 9, 2007

(54) INTERNALLY COOLED PRESSURE CONTAINMENT APPARATUS

(75) Inventors: Walter W. Robertson, Shippenville, PA (US); Jason L. Robertson, Erie, PA (US)

(73) Assignee: Hydro-Pac, Inc., Shippenville, PA (US)

( * ) Notice: Subject to any disclaimer, the term of this patent is extended or adjusted under 35 U.S.C. 154(b) by 375 days.

(21) Appl. No.: 10/409,747

(22) Filed: Apr. 8, 2003

(65) Prior Publication Data

US 2003/0213805 A1 Nov. 20, 2003

Related U.S. Application Data

(62) Division of application No. 09/887,408, filed on Jun. 22, 2001, now abandoned.

(60) Provisional application No. 60/213,971, filed on Jun. 23, 2000.

(51) Int. Cl.
F17C 1/00 (2006.01)
(52) U.S. Cl. ...................................... 220/586
(58) Field of Classification Search ................ 220/581
See application file for complete search history.

(56) References Cited

U.S. PATENT DOCUMENTS

| | | | |
|---|---|---|---|
| 3,970,208 A | 7/1976 | Raes | 220/3 |
| 4,261,415 A | 4/1981 | Smith, Jr. | 165/1 |
| 4,268,708 A | 5/1981 | Smith, Jr. et al. | 13/20 |
| 4,279,581 A | 7/1981 | Betz | 425/78 |
| 4,537,569 A | 8/1985 | Asari et al. | 425/405 H |
| 4,629,412 A | 12/1986 | Inoue et al. | 425/405 |
| 4,756,680 A | 7/1988 | Ishii | 425/78 |
| 4,910,823 A | 3/1990 | Silverman et al. | 15/1 |
| 4,968,009 A | 11/1990 | Asari et al. | 266/252 |
| 5,087,409 A | 2/1992 | Wedellsborg et al. | 376/294 |
| 5,118,289 A | 6/1992 | Bergman et al. | 432/205 |
| 5,251,880 A | 10/1993 | Ishii et al. | 266/44 |
| 5,553,106 A | 9/1996 | Enomoto et al. | 376/305 |
| 5,615,734 A | 4/1997 | Hyp | 165/11.2 |
| 2004/0004314 A1 * | 1/2004 | Yoneda et al. | 266/249 |

FOREIGN PATENT DOCUMENTS

| | | |
|---|---|---|
| DE | 3833337 A1 | 4/1990 |
| EP | 0 502 704 A1 | 9/1992 |
| JP | 02293585 | 4/1990 |

* cited by examiner

*Primary Examiner*—Stephen Castellano
(74) *Attorney, Agent, or Firm*—The Bilicki Law Firm, PC (57) ABSTRACT

A pressure containment apparatus includes a shell having a top end and a bottom end forming a pressure chamber. The pressure containment apparatus also includes a liner having an outside diameter larger than an inside diameter of the shell, wherein the liner is removably restrained within the shell by a frictional force between the liner and the shell. A retainer and retainer spring supporting the retainer are disposed within a space between the liner and a bottom manifold such that the retainer and retainer spring minimize axial forces exerted on a bottom end flange of the pressure containment apparatus.

36 Claims, 7 Drawing Sheets

INTERNALLY COOLED PRESSURE CONTAINMENT APPARATUS

CLAIM TO PRIORITY

The present patent application is a divisional application of U.S. patent application Ser. No. 09/887,408 filed on Jun. 22, 2001, now abandoned, incorporated by reference herein, which claims priority to U.S. Provisional Patent Application Ser. No. 60/213,971 filed on Jun. 23, 2000, incorporated by reference herein.

DETAILED DESCRIPTION OF PREFERRED EMBODIMENTS

For the purpose of promoting an understanding of the present invention, references are made in the text hereof to embodiments of an internally cooled pressure vessel, some of which are depicted in the drawings. It is nevertheless understood that no limitations to the scope of the invention are thereby intended. One of ordinary skill in the art will readily appreciate that modifications such as those involving the size, the placement and the number of ports, or the geometry of the components, do not depart from the spirit and scope of the present invention. Some of these possible modifications are mentioned in the following description. With particular reference to the drawings, like reference numerals refer to identical structural elements in the various drawings.

Moreover, the term "substantially" or "approximately" as used herein may be applied to modify any quantitative representation that could permissibly vary without resulting in a change in the basic function to which it is related. For example, an internally cooled pressure vessel as disclosed herein as having a substantially cylindrical shape might permissibly have a somewhat non-cylindrical shape within the scope of the invention if its capability of functioning as an internally cooled pressure vessel is not materially altered.

Figure 1:
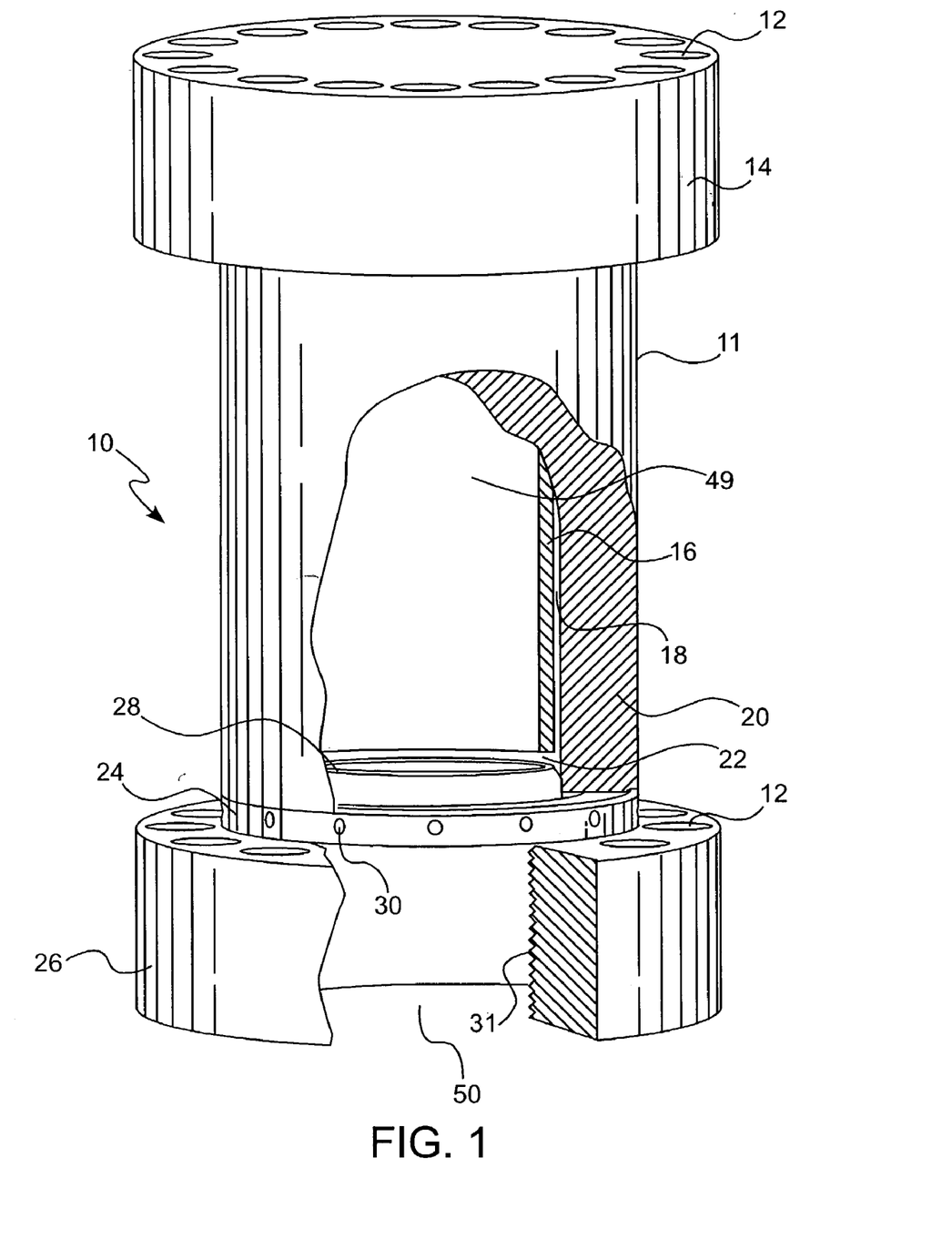
FIG. 1 is a perspective view, with some cut-away portions, of one embodiment of the invention.

FIGS. 1–7B illustrate one embodiment of the invention, generally designated as pressure vessel 10. FIG. 1 depicts a side perspective view, with some cut-away portions, of pressure vessel 10. Pressure vessel 10 includes pressure cylinder 11, top end flange 14, liner 16, bottom manifold 24, bottom end flange 26, removable flange 28, and top manifold 36. In the embodiment shown, pressure cylinder 11 is substantially cylindrical. Pressure vessel 10 is constructed of a material well known in the art for constructing pressure vessels.

Figure 2:
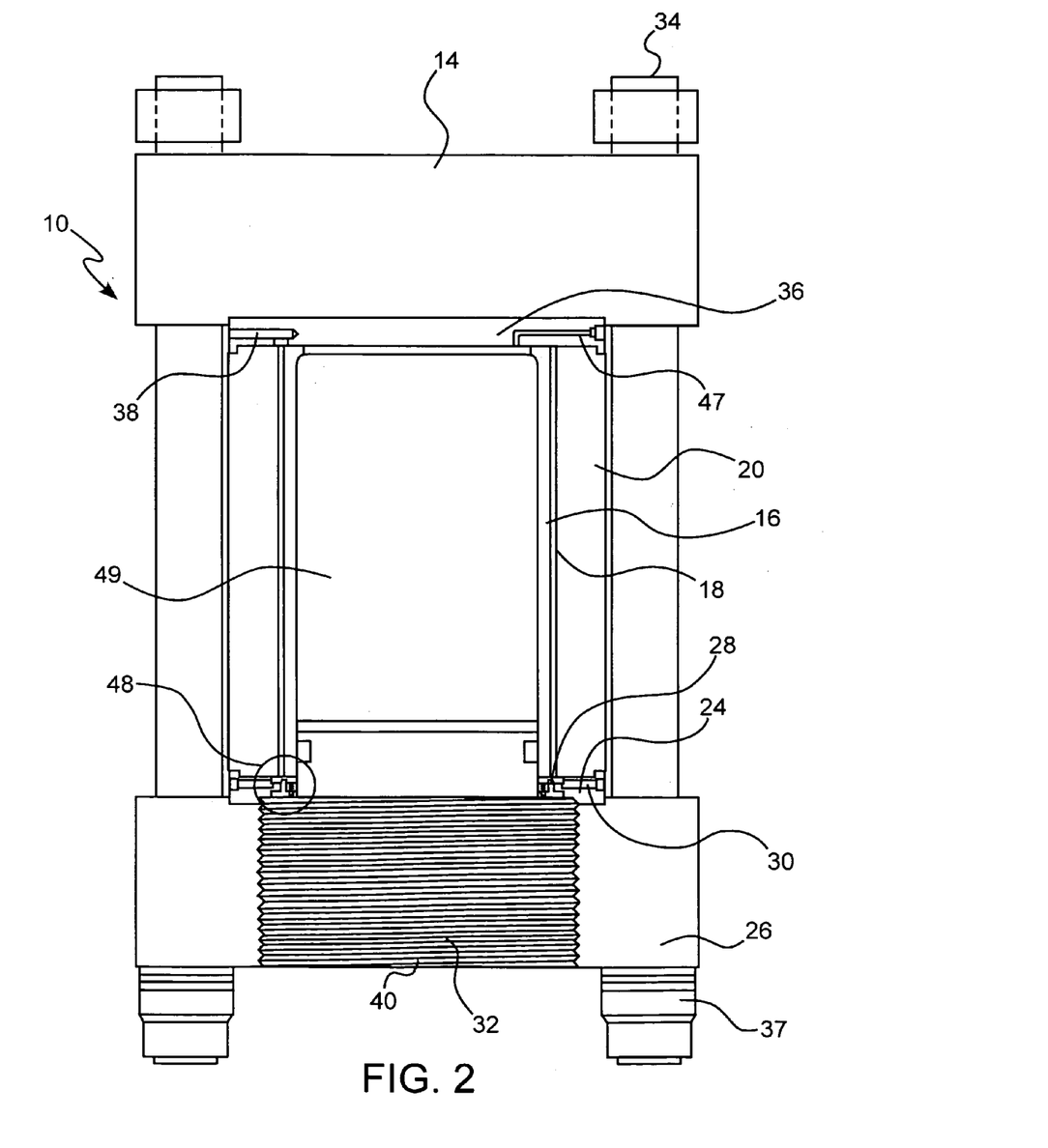
FIG. 2 is a cross-sectional view of one embodiment of the invention.

As illustrated in FIG. 1, pressure cylinder 11 is defined by shell 20. Shell 20 has a top opening and a bottom opening. Shell 20, in combination with bottom manifold 24, top manifold 36, top end flange 14, and bottom end flange 26, defines pressure chamber 49. Bottom manifold 24, which is adapted to contact and connect with the bottom end of shell 20, has a plurality of inlet ports 30. Removable flange 28 is nested within bottom manifold 24. As shown in FIG. 2, top manifold 36 is adapted to contact and connect with the top end of shell 20 and includes a plurality of outlet ports 38.

Referring further to FIG. 1, bottom manifold 24 is further adapted to mate with the upper portion of bottom end flange 26, while top manifold 36 is further adapted to mate with the bottom portion of top end flange 14. In the embodiment shown, bottom end flange 26 is formed with a closure hole 50 having internal threads 31. As discussed more fully below, a bottom closure 40 (see FIG. 4B) is adapted to engage with internal threads 31 to close bottom end flange 26. In the embodiment shown in FIG. 1, top end flange 14 and bottom end flange 26 also have a plurality of tie rod holes 12.

Liner 16 is disposed within pressure cylinder 11. In one embodiment of the invention, an outside diameter of liner 16 is larger than an inside diameter of shell 20. Liner 16 is held in place within pressure cylinder 11 due to a slight interference created between the larger outside diameter of liner 16 and the smaller inside diameter of shell 20. Liner 16 is not fixedly attached to any structural elements of pressure vessel 10 and, for this reason, liner 16 is referred to as a floating liner. To install liner 16, shell 20 is heated, allowing the inside diameter of shell 20 to expand such that liner 16 may be inserted into pressure cylinder 11. Once liner 16 is disposed within pressure cylinder 11, shell 20 is cooled. As such, liner 16 is shrink-fitted within pressure cylinder 11.

FIG. 2 is a cross-sectional view of one embodiment of the invention. As further shown in FIG. 2, bottom manifold 24 has inlet ports 30 and top manifold 36 has outlet ports 38. FIG. 2 also depicts bottom closure 40 with external threads 32. Bottom closure 40 is adapted to close bottom end flange 26 by threadingly engaging with internal threads 31 (as shown in FIG. 1) of closure hole 50. When bottom closure 40 is removed, one can gain access to liner 16 and removable flange 28. Removal of removable flange 28 allows further access to liner 16 and cooling grooves 18, as discussed below.

As shown in FIG. 2, tie rods 34 and spherical washers 37 are used to attach the components of pressure vessel 10. Each one of tie rods 34 are shown to extend through one of tie rod holes 12 in top end flange 14 and one of the corresponding tie rod holes 12 in bottom end flange 26. In the embodiment shown, each of tie rods 34 are held in place by one of spherical washers 37 located on the top and bottom ends of tie rods 34. The use of spherical washers 37 and tie rods 34 reduces the bending forces applied to top end flange 14, bottom end flange 26 during operation of pressure vessel 10 at high pressure.

As shown in FIGS. 1–2, pressure vessel 10 has cooling grooves 18. In the embodiment shown, cooling grooves 18 are formed in liner 16 and are axial. One of ordinary skill in the art will readily appreciate that cooling grooves 18 can also be machined in shell 20, or formed by separate lengthwise strips disposed between liner 16 and shell 20. Moreover, cooling grooves 18 need not be axial. For example, in an alternative embodiment, cooling grooves 18 can be helical.

In one embodiment a cooling liquid (not shown) is pumped into bottom manifold 24 through one or more of inlet ports 30 and travels through cooling grooves 18. The cooling liquid then exits through one or more of outlet ports 38 in top manifold 36. As the temperature of liner 16 increases, the cooling liquid traveling through cooling grooves 18 moderates the temperature of shell 20. By moderating the temperature of shell 20, the axial forces exerted on top end flange 14 and bottom end flange 26 are minimized, thereby reducing the stresses on tie rods 34.

Figure 3A:
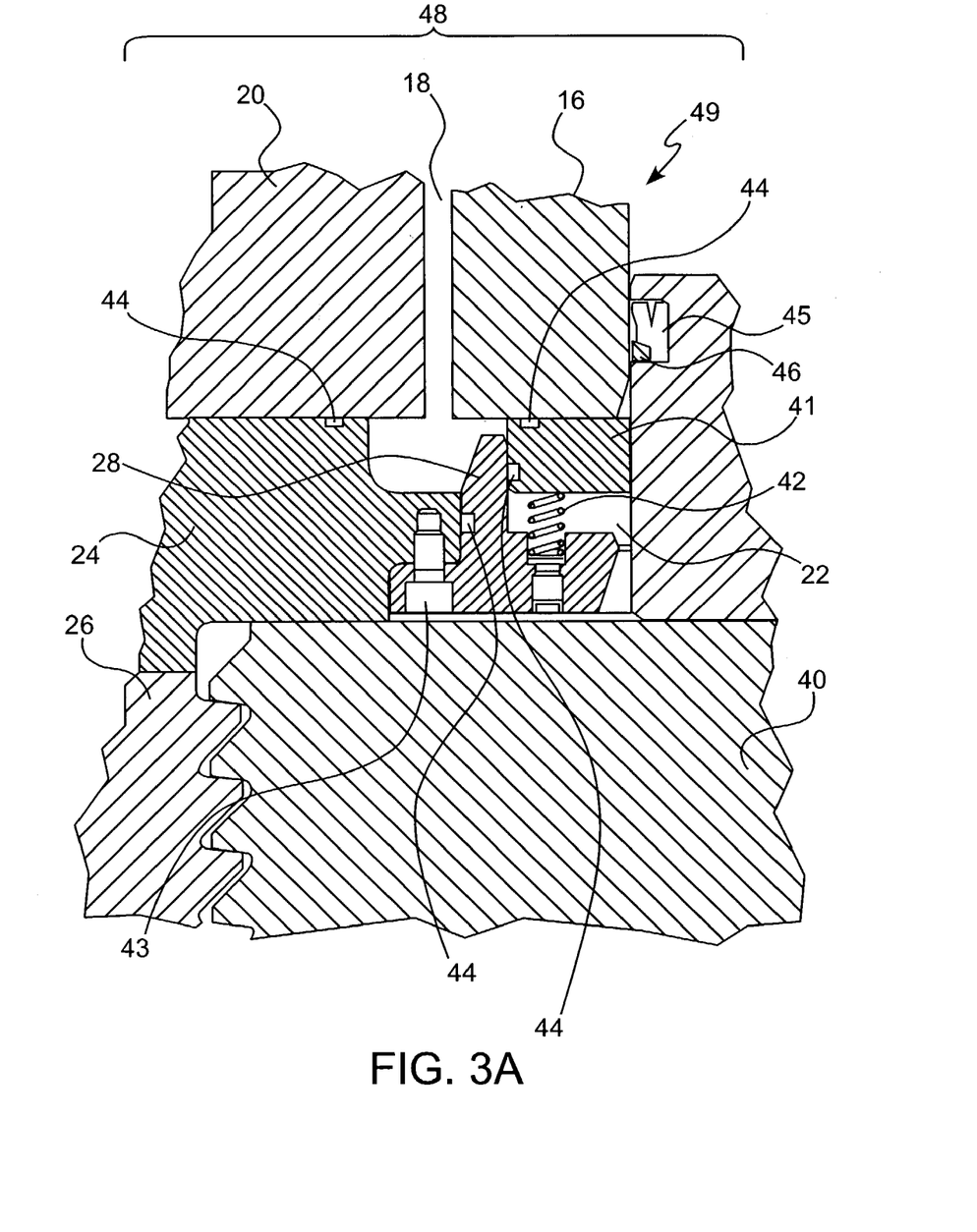
FIG. 3A is an enlarged view of the area circled in FIG. 2.

Furthermore, as described above, liner 16 is a floating liner within pressure cylinder 11. That is, liner 16 is not fixedly attached to any structural elements of pressure vessel 10. Rather, liner 16 is sized to be held in place within pressure cylinder 11 by the friction force between liner 16 and shell 20. At elevated temperatures, liner 16 expands axially toward removable flange 28. A retainer 41 and a corresponding retainer spring 42 (as shown in FIG. 3A), which are disposed within a space 22, bias liner 16 away from removable flange 28 as liner 16 expands axially. Therefore, even though liner 16 expands axially at elevated temperatures, liner 16 exerts only minimal axial force on bottom end flange 26, top end flange 14, and tie rods 34.

Referring further to FIG. 2, top manifold 36 also includes a pressurizing port 47. Pressurizing port 47 provides access so that a pressurizing medium can be introduced into pressure chamber 49 to achieve high pressure in pressure chamber 49. One of ordinary skill in the art will readily appreciate that pressurizing port 47 can also be used to vent pressure chamber 49. Moreover, one of ordinary skill in the art will readily appreciate that the number of outlet ports 38 and pressurizing ports 47 on top manifold 36 can vary. Because the manner and process by which pressure vessels are pressurized and vented is well known to one of ordinary skill in the art, the apparatus and process are not described herein in detail. Moreover, one of ordinary skill in the art will readily appreciate that pressurizing agents well know in the art can be used to pressurize chamber 49.

FIG. 3A is an enlarged view of the area designated by circle 48 in FIG. 2. The enlarged view in FIG. 3A shows retainer 41 and retainer spring 42 disposed within space 22. When liner 16 is heated, liner 16 expands axially toward space 22, such that the bottom edge of liner 16 applies pressure onto retainer 41. This pressure, in turn, is transferred to retainer spring 42. When pressure is exerted on retainer spring 42, space 22 diminishes but is maintained by retainer spring 42. In this way, retainer 41 and retainer spring 42 allow for the axial expansion of liner 16 into space 22. As a result, the axial forces exerted on top-end flange 14, bottom-end 26, or tie rods 34 are minimized.

The enlarged view of FIG. 3A further illustrates the relationship between bottom closure 40, bottom manifold 24, removable flange 28, and cooling grooves 18. In particular, as shown in FIG. 3A, removable flange 28 is removably secured to bottom manifold 24 by at least one screw 43. Removing bottom closure 40 provides access to remove screws 43 and removable flange 28 from bottom manifold 24. Once removable flange 28 is removed, one has access to cooling grooves 18 to inspect both liner 16 and cooling grooves 18. Therefore, pressure vessel 10 does not have to be completely dismantled in order to inspect liner 16 and cooling grooves 18.

One of ordinary skill in the art will readily appreciate that the inspection of liner 16 and cleaning grooves 18 can be carried out by visual inspection, or by using other inspection techniques well known in the art, such as ultrasonic inspection or magnetic-particle inspection techniques. Moreover, one of ordinary skill in the art will readily appreciate that the presence of helical cooling grooves would necessitate the use of a flexible borescope for inspection.

If necessary, a cleaning device, such as a high-pressure water-blasting lance, can be inserted into each of cooling grooves 18 to remove any dirt or debris therefrom. One of ordinary skill in the art will readily appreciate that other cleaning devices can be used to clean cooling grooves 18. Moreover, one of ordinary skill in the art will readily appreciate that the presence of helical cooling grooves would necessitate the use of a flexible high-pressure water-blasting lance. Finally, liner 16 can be removed from pressure cylinder 11 for cleaning by applying modest heat to the outside diameter of pressure cylinder 11 such that pressure cylinder expands to allow liner 16 to drop from pressure cylinder 11.

As further shown in FIG. 3A, in one embodiment a high pressure or elastomer seal 45 seals pressure chamber 49. In the embodiment shown here, anti-extrusion ring 46 reinforces elastomer seal 45. However, in an alternate embodiment, anti-extrusion ring 46 is not necessary to reinforce elastomer seal 45. In the embodiment shown in FIG. 3A, an o-ring seal 44 is utilized between cooling grooves 18, shell 20, bottom manifold 24, liner 16, and retainer 41. O-ring seals 44 prevent cooling liquid from leaking from pressure vessel 10.

Figure 3B:
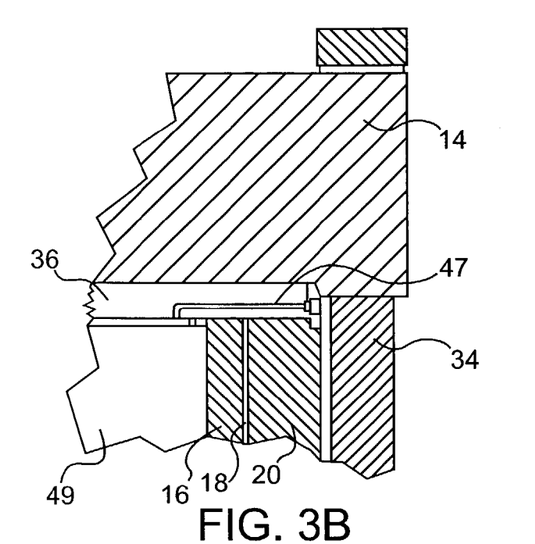
FIG. 3B is an enlarged view of a section of an assembled top manifold in one embodiment of the invention.

FIG. 3B shows a detailed, enlarged view of a section of top manifold 36 when pressure vessel 10 is assembled. Specifically, pressurizing port 47 is shown in more detail in FIG. 3B. Moreover, FIG. 3B illustrates the relationship between top manifold 36, top end flange 14, shell 20, liner 16, and cooling grooves 18.

Figure 4A:
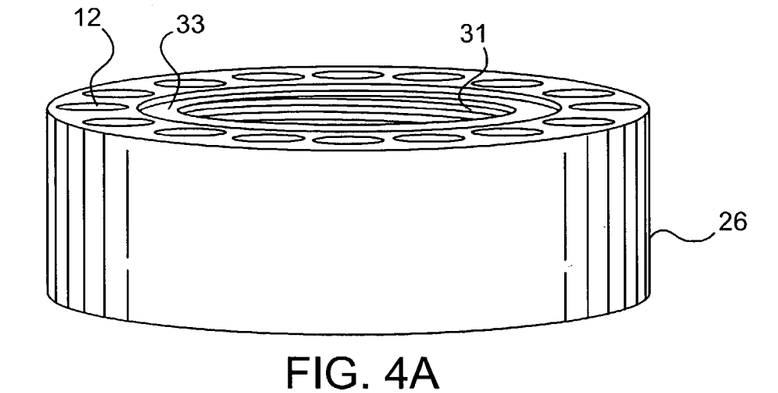
FIG. 4A is a side perspective view of a bottom end flange in one embodiment of the invention.
Figure 4B:
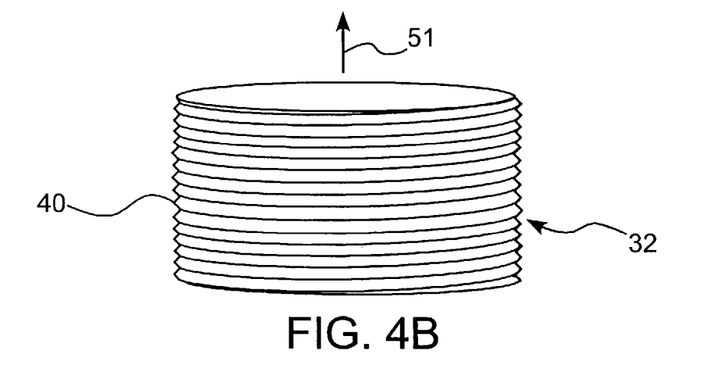
FIG. 4B is a side perspective view of a bottom closure in one embodiment of the invention.

FIGS. 4A and 4B are side perspective views of bottom end flange 26 and bottom closure 40, respectively. In the embodiment shown here, external threads 32 cover the outer surface of bottom closure 40, such that bottom closure 40 is fully threaded and adapted to threadingly engage with internal threads 31. However, in an alternate embodiment, external threads 32 and internal threads 31 can be interrupted. If interrupted, a fraction of a turn of bottom closure 40 will permit the removal of bottom closure 40 from bottom end flange 26. Arrow 51 indicates the point where bottom closure 40 is inserted into bottom end flange 26.

Referring further to FIG. 4A, bottom end flange 26 has annular recess 33 which allows bottom manifold 24 and bottom end flange 26 to mate. Although not shown, top end flange 14 also possesses such an annular recess, which allows top manifold 36 and top end flange 14 to mate.

Figure 5A:
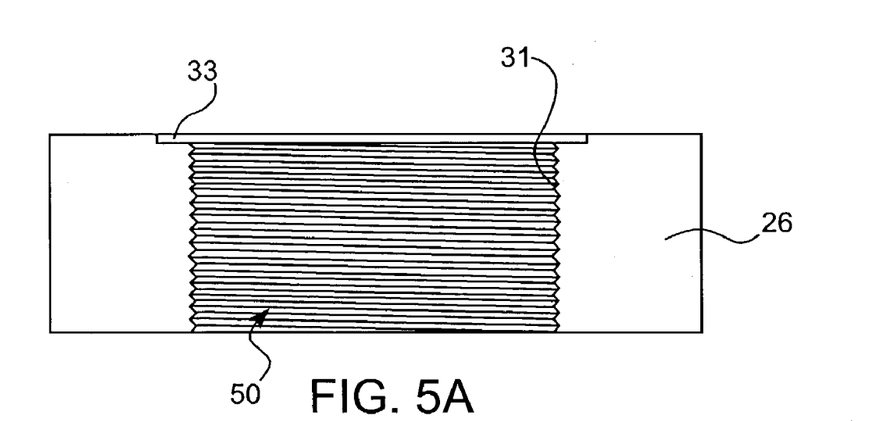
FIG. 5A is a side cross-sectional view of a bottom end flange without a bottom closure in one embodiment of the invention.
Figure 5B:
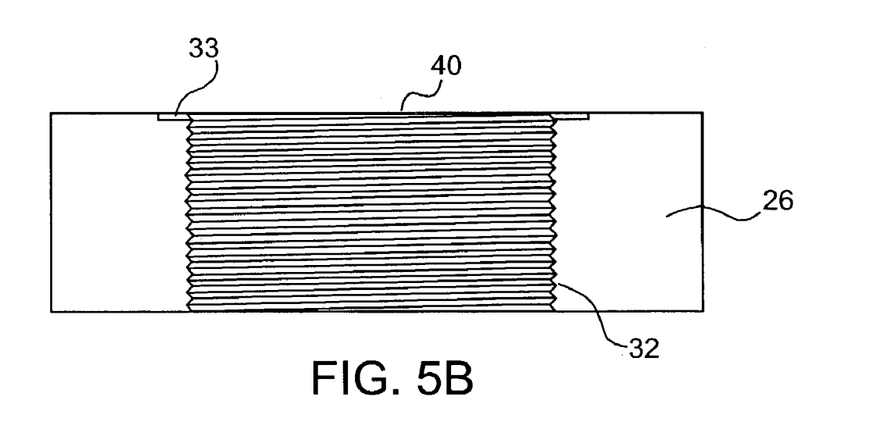
FIG. 5B is a side cross-sectional view of a bottom end flange with a bottom closure in one embodiment of the invention.
Figure 5C:
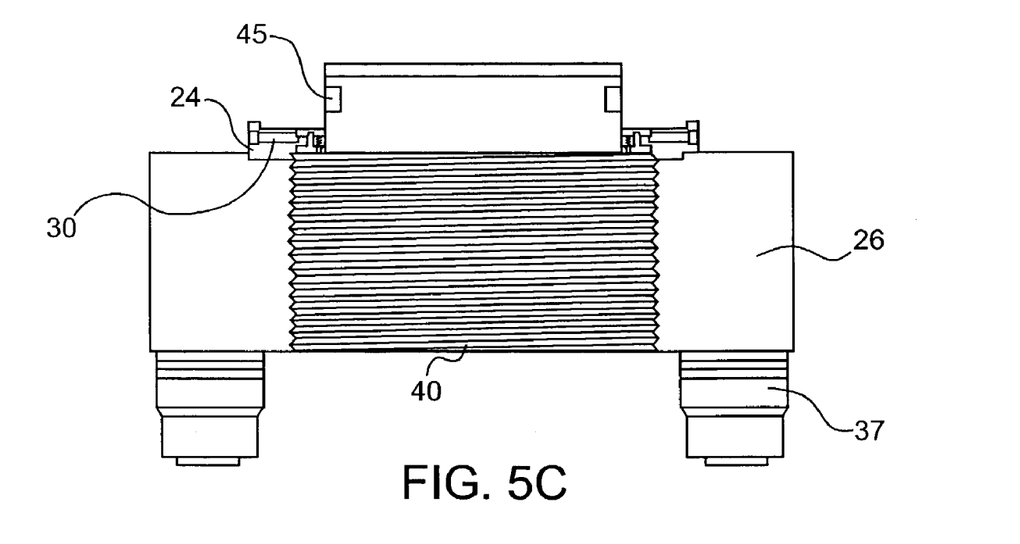
FIG. 5C is a side cross-sectional view of a bottom end flange with a bottom manifold attached in one embodiment of the invention.

FIGS. 5A through 5C show a cross-sectional view of bottom end flange 26 at different stages of assembly for one embodiment of the invention. Specifically, FIG. 5A illustrates bottom end flange 26 absent bottom closure 40. When bottom closure 40 is not threadingly engaged with closure hole 50, as in FIG. 5A, one is able to observe internal threads 31. FIG. 5A also shows annular recess 33 in bottom end flange 26, which is adapted to mate with bottom manifold 24. FIG. 5B illustrates bottom end flange 26 when bottom closure 40 is threadingly engaged with closure hole 50. In this view, one is able to observe external threads 32. Finally, FIG. 5C illustrates bottom end flange 26 fully assembled with bottom closure 40 threadingly engaged with closure hole 50, and bottom manifold 24 mated with annular recess 33 of bottom end flange 26. FIG. 5C also demonstrates spherical washers 37. As mentioned above, spherical washers 37 are used to reduce the bending forces applied to top end flange 14, bottom end flange 26, and tie rods 34 during operation of pressure vessel 10 at high pressure. FIG. 5C also illustrates elastomer seal 45 (for sealing pressure chamber 49) and inlet ports 30 (for introducing cooling liquid into bottom manifold 24).

Figure 6A:
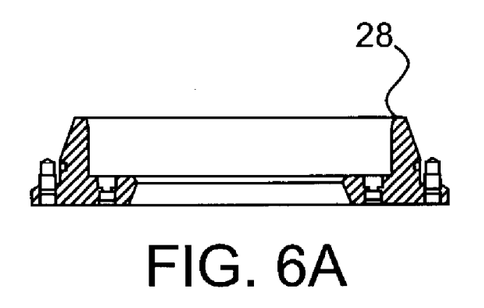
FIG. 6A is a side cross-sectional view of a removable flange in one embodiment of the invention.
Figure 6B:
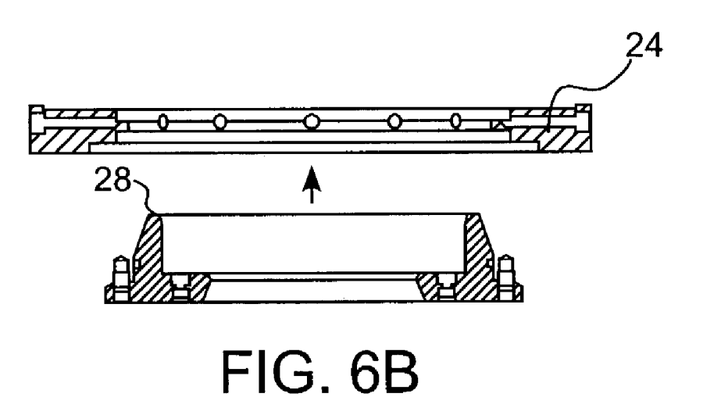
FIG. 6B is a side cross-sectional view of a disassembled removable flange and a bottom manifold in one embodiment of the invention.
Figure 6C:
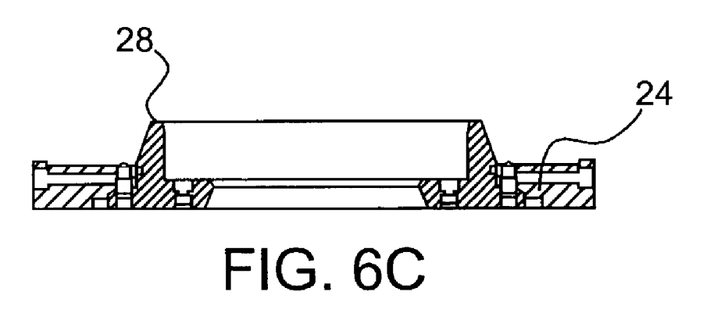
FIG. 6C is a side cross-sectional view of a assembled removable flange and a bottom manifold in one embodiment of the invention.

FIGS. 6A through 6C show a side cross-sectional view of removable flange 28 at different stages of assembly with bottom manifold 24. Specifically, FIG. 6A illustrates removable flange 28 absent assembly with bottom manifold 24. As shown in FIG. 6B, removable flange 28 is adapted to engage with bottom manifold 24. The arrow in FIG. 6B depicts the manner in which removable flange 28 is inserted into bottom manifold 24. Finally, FIG. 6C illustrates removable flange 28 fully engaged with bottom manifold 24.

Figure 7A:
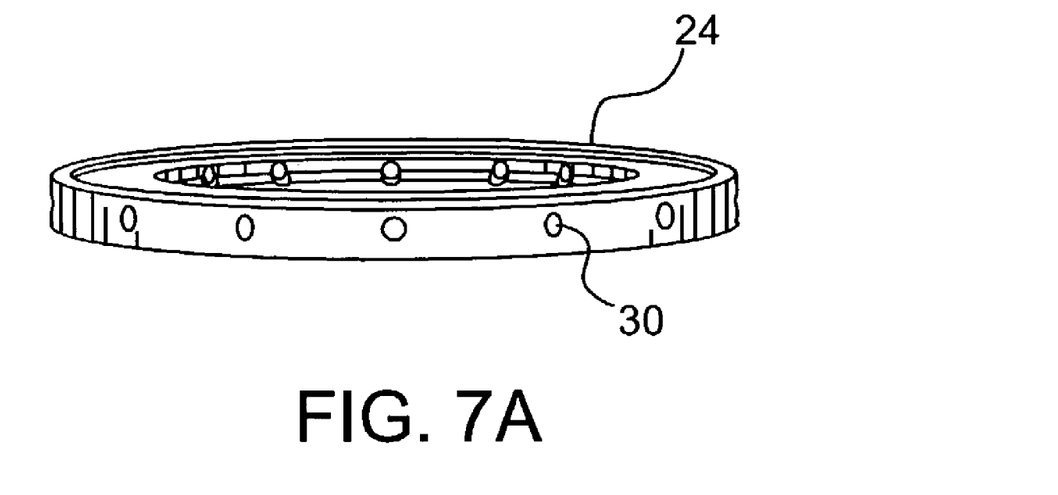
FIG. 7A is a perspective view of a bottom manifold in one embodiment of the invention.
Figure 7B:
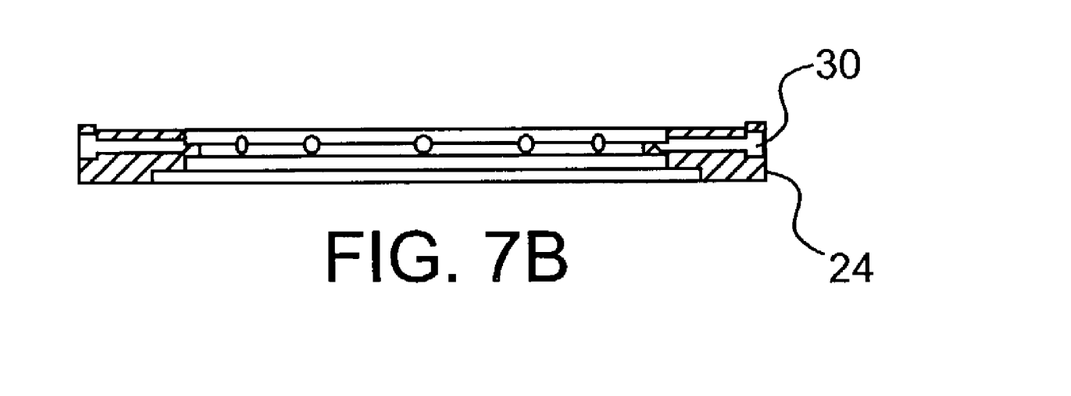
FIG. 7B is cross-sectional side view of a bottom manifold in one embodiment of the invention.

FIG. 7A shows a perspective view of bottom manifold 24. FIG. 7B shows a cross-sectional view of bottom manifold 24. As illustrated in FIGS. 7A–7B, inlet ports 30 allow cooling liquid to be introduced into the upper portion of pressure chamber 49 during operation of pressure vessel 10. Inlet ports 30 also facilitate the outflow of residual cooling liquid when operation of pressure vessel 10 is completed.

The description presented in the embodiments shown herein is not intended to demonstrate all of the possible arrangements and modifications to the design. For those skilled in the art, changes will be apparent that will fall within the scope of the present invention.

What is claimed is:

1. A pressure containment apparatus comprising:
   a shell having a top end and a bottom end;
   a liner disposed within said shell;
   a bottom manifold adapted to contact said bottom end of said shell, said bottom manifold having a first plurality of ports;
   a top manifold adapted to contact said top end of said shell, said top manifold having a second plurality of ports;
   a bottom end flange adapted to mate with said bottom manifold and a top end flange adapted to mate with said top manifold, thereby forming a pressure chamber, said bottom end flange comprising a hole for access to said pressure chamber and a bottom closure adapted to threadingly engage with said hole;
   a plurality of grooves formed between said shell and said liner for cooling said shell; and
   a plurality of tie rods, each of said plurality of tie rods extending through a plurality of holes in said top end flange and said bottom end flange.

2. A pressure containment apparatus according to claim 1 wherein said bottom closure is fully threaded.

3. A pressure containment apparatus according to claim 1 wherein said bottom closure is interruptedly threaded.

4. A pressure containment apparatus according to claim 1 further comprising a removable flange adapted to be removably secured to said bottom manifold.

5. A pressure containment apparatus according to claim 4 wherein removal of said bottom closure and said removable flange provide access to said plurality of grooves and said liner, such that said plurality of grooves and said liner can be inspected and cleaned.

6. A pressure containment apparatus according to claim 1 wherein said liner has an outside diameter larger than the inside diameter of said shell, such that said liner is removably restrained within said shell by a frictional force between said liner and said shell.

7. A pressure containment apparatus according to claim 6 wherein said liner is installed within said shell by heating up said shell and inserting said liner.

8. A pressure containment apparatus according to claim 1 further comprising a retainer and retainer spring disposed within a space between said liner and said bottom manifold, wherein said retainer and retainer spring minimize axial forces exerted on said bottom end flange.

9. A pressure containment apparatus according to claim 1 wherein a cooling liquid is introduced into said plurality of grooves through at least one of said first plurality of ports and exits from said plurality of grooves through at least one of said second plurality of ports.

10. A pressure containment apparatus according to claim 9 wherein at least one of said second plurality of ports further provides access for pressurizing and venting said pressure containment apparatus.

11. A pressure containment apparatus according to claim 1 wherein said plurality of grooves are formed by spacers disposed between said liner and said shell.

12. A pressure containment apparatus according to claim 11 wherein said plurality of grooves are aligned in an axial direction.

13. A pressure containment apparatus according to claim 11 wherein said plurality of grooves are aligned in a helical direction.

14. A pressure containment apparatus according to claim 1 wherein said plurality of grooves are formed into the interior surface of said shell.

15. A pressure containment apparatus according to claim 14 wherein said plurality of grooves are aligned in an axial direction.

16. A pressure containment apparatus according to claim 14 wherein said plurality of grooves are aligned in a helical direction.

17. A pressure containment apparatus according to claim 1 wherein said plurality of grooves are formed into the exterior surface of said liner.

18. A pressure containment apparatus according to claim 17 wherein said plurality of grooves are aligned in an axial direction.

19. A pressure containment apparatus according to claim 17 wherein said plurality of grooves are aligned in a helical direction.

20. A pressure containment apparatus according to claim 1 further comprising a plurality of spherical washers, wherein each of said plurality of spherical washers is adapted to engage with each of said plurality of tie rods.

21. A pressure containment apparatus comprising:
   a shell having a top end and a bottom end;
   a bottom manifold adapted to contact said bottom end of said shell, said bottom manifold having a first plurality of ports;

a top manifold adapted to contact said top end of said shell, said top manifold having a second plurality of ports;

a bottom end flange adapted to mate with said bottom manifold and a top end flange adapted to mate with said top manifold, thereby forming a pressure chamber;

a liner having an outside diameter larger than an inside diameter of said shell, wherein said liner is removably restrained within said shell by a frictional force between said liner and said shell;

a plurality of grooves formed between said shell and said liner;

a retainer and retainer spring supporting said retainer disposed within a space between said liner and said bottom manifold, wherein said retainer and retainer spring minimize axial forces exerted on said bottom end flange.

22. A pressure containment apparatus according to claim 21 wherein said bottom end flange comprises a hole for access to said pressure chamber and a bottom closure adapted to threadingly engage with said hole.

23. A pressure containment apparatus according to claim 21 wherein a cooling liquid is introduced into said plurality of grooves through at least one of said first plurality of ports and exits from said plurality of grooves through at least one of said second plurality of ports.

24. A pressure containment apparatus according to claim 23 wherein at least one of said second plurality of ports further provides access for pressurizing and venting said pressure containment apparatus.

25. A pressure containment apparatus according to claim 21 wherein said plurality of grooves are formed by spacers disposed between said liner and said shell.

26. A pressure containment apparatus according to claim 25 wherein said plurality of grooves are aligned in an axial direction.

27. A pressure containment apparatus according to claim 25 wherein said plurality of grooves are aligned in a helical direction.

28. A pressure containment apparatus according to claim 21 wherein said plurality of grooves are formed into the interior surface of said shell.

29. A pressure containment apparatus according to claim 28 wherein said plurality of grooves are aligned in an axial direction.

30. A pressure containment apparatus according to claim 28 wherein said plurality of grooves are aligned in a helical direction.

31. A pressure containment apparatus according to claim 21 wherein said plurality of grooves are formed into the exterior surface of said liner.

32. A pressure containment apparatus according to claim 31 wherein said plurality of grooves are aligned in an axial direction.

33. A pressure containment apparatus according to claim 31 wherein said plurality of grooves are aligned in a helical direction.

34. A pressure containment apparatus according to claim 21 further comprising a plurality of tie rods, each of said plurality of tie rods extending through a plurality of holes in said top end flange and said bottom end flange.

35. A pressure containment apparatus according to claim 34 further comprising a plurality of spherical washers, wherein each of said plurality of spherical washers is adapted to engage with each of said plurality of tie rods.

36. A pressure containment apparatus according to claim 21 wherein said liner is installed within said shell by heating up said shell and inserting said liner.

* * * * *